INVENTOR
ERNEST L. ANDERSON
By Young & Thompson
ATTYS.

United States Patent Office 3,428,437
Patented Feb. 18, 1969

3,428,437
ZONE REFINING
Ernest L. Anderson, Lynnwood, Pretoria, Transvaal, Republic of South Africa, assignor to South African Iron and Steel Industrial Corporation Limited
Filed July 13, 1965, Ser. No. 471,693
U.S. Cl. 23—301                                        22 Claims
Int. Cl. B01j 17/16

ABSTRACT OF THE DISCLOSURE

A method and an apparatus for zone refining crystalline material by subjecting the latter to one or more melting-recrystallizing cycles while under the influence of centrifugal force. The material is introduced into a container and the latter is rotated about an axis which does not pass through the material, thereby to urge the material against a wall of the container under the action of centrifugal force resulting from the rotation, the quantity of the material being such that it only partially fills the container in the direction of the centrifugal force. At least one molten zone is established in and moved through the material to zone refine it while it remains under the influence of the centrifugal force.

---

Zone refining is a well-known technique for the preparation of extremely pure metals, such as for the manufacture of semi-conductors, and has also been applied to organic chemical compounds. By means of zone refining, compounds can be obtained in a state of extreme purity. Zone refining consists in heating a mass of material which is of solid form to melt it in a single zone or in a plurality of spaced zones, and moving the molten zone or zones through the mass of material. Due to a difference in solubility of impurities present in the material, in the solid and the liquid states of the material, either impurities or purified material is/are carried along with the molten zone or zones. Thereby impurities are concentrated in one part of the mass whilst purified material is contained in the opposite part.

Normally in practice, a plurality of spaced molten zones are moved successively, slowly and in one direction through material which is otherwise of solid form. This is usually accomplished by moving heating means along a stationary mass of solid material which is either in the form of an ingot or contained in a suitable container. At a given point in the mass, the material will be solid until it is reached by the moving heating means. It will then melt, remain in the molten state for a period of time, and as the heating means moves away it will recrystallise or freeze again, being enriched in either pure material or impurities. Such a melting-liquid state-freezing sequence is commonly termed a cycle. The desired purity of the material is usually only reached after a number of such cycles.

When the solubility of the impurities in the solid state of the substance differs only slightly from the solubility of the impurities in the liquid state of the substance, it is obvious that substantial separation of purified material and impurities will take place only after many melting-freezing cycles. Also, for the separation by zone refining of a mixture of chemical compounds which is introduced at the head of a column of solid solvent and having very nearly the same ratio of solubilities in the liquid and solid states of the solvent, the same difficulty arises. It is therefore an advantage to have as long a rod or column of material as possible. However, if only a single molten zone is passed through the compound, this must be done a great number of times and will take an impractically long time. Alternatively, a large number of heaters can be installed to create a plurality of molten zones in the substance to be purified. This has, however, also proved to be impractical and uneconomical.

If refining is carried out in straight glass tubes, as is usually done when refining organic compounds, additional difficulties arise. When the tube is in a substantially horizontal position, the molten material tends to seep back under the re-crystallised areas, thus rendering efficient purification or separation extremely difficult. Vertical tubes, on the other hand, tend to shatter due to the difference in volume of the solid and the liquid states of the material undergoing zone refining.

It is accordingly an object of the present invention to minimize the above-mentioned disadvantages.

According to one aspect of the invention a method of zone refining includes the steps of introducing material to be refined into a container; subjecting the material to centrifugal force to urge the material against a wall of the container, the quantity of material in the container being such that the material only partially fills the container in the direction of the centrifugal force; heating the material to produce at least one molten zone in the material which is otherwise of solid form; and moving the molten zone through the material to subject the latter to a melting-freezing cycle.

With the method according to the invention, the material to be refined is urged into contact with the container wall by centrifugal force. By introducing the material in suitable manner at a suitable rate or in suitable quantity, the material does not fill the container completely in the direction of the centrifugal force. This provides space for expansion of the material in the vicinity of the molten zone, thereby eliminating or at least minimizing the danger of cracking or shattering of the container. Preferably, the molten zone communicates with free space in the partially filled container.

The force with which the material is urged into contact with the container wall, minimizes seepage of molten material under recrystallised or frozen material.

It has also been found that quite unexpectedly, more rapid and effective refining is achieved by subjecting the material to centrifugal force during refining.

The molten zone may be moved transversely to the direction of the centrifugal force.

Alternatively, the molten zone may be moved longitudinally with respect to direction of the centrifugal force.

Preferably, the material is subjected to a plurality of melting-freezing cycles.

A plurality of spaced molten zones may be produced simultaneously and moved in succession through the material.

Preferably, the centrifugal force at least equals the force of gravity.

According to another aspect of the invention zone refining apparatus includes a container rotatable about an axis at a speed producing centrifugal force to urge material in the container against a retaining wall rotatable with the container; and heating means for producing at least one heating zone, the retaining wall and the heating zone being relatively movable to produce in otherwise solid material in the container a molten zone movable through the material. The retaining wall may be part of the container or may be constituted by material in the container.

The retaining wall and the heating means may be relatively movable to produce relative movement between the retaining wall and the heating zone.

The heating means may be linearly movable relative to the container and longitudinally with respect to the axis of rotation of the container.

Alternatively, the heating means may be rotatable relative to at least part of the container.

In another arrangement, the heating means may be rotatable with the retaining wall, different portions of the heating means being heatable successively to produce at least one heating zone movable relative to the retaining wall.

Preferred embodiments of the invention will now be described by way of example with reference to the accompanying drawings in which.

Figure 1:
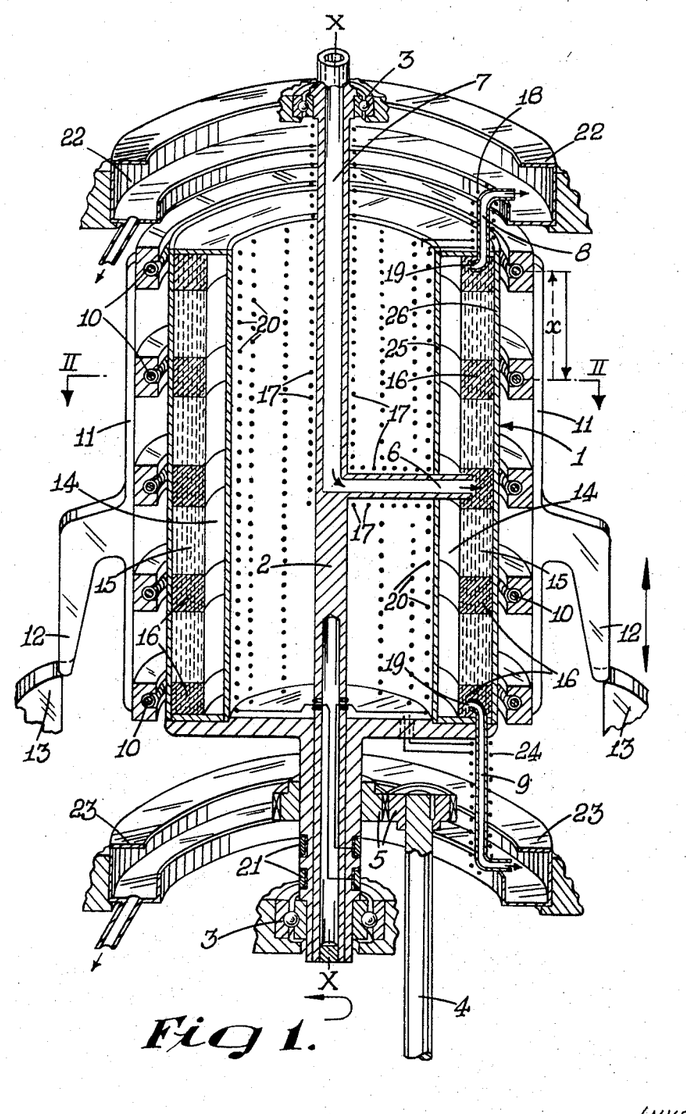
FIGURE 1 is a sectional elevational view of an embodiment of apparatus according to the invention, in which heating means is linearly movable relative to a rotary container and molten zone movement is in a direction transversely to the direction of centrifugal force.
Figure 2:
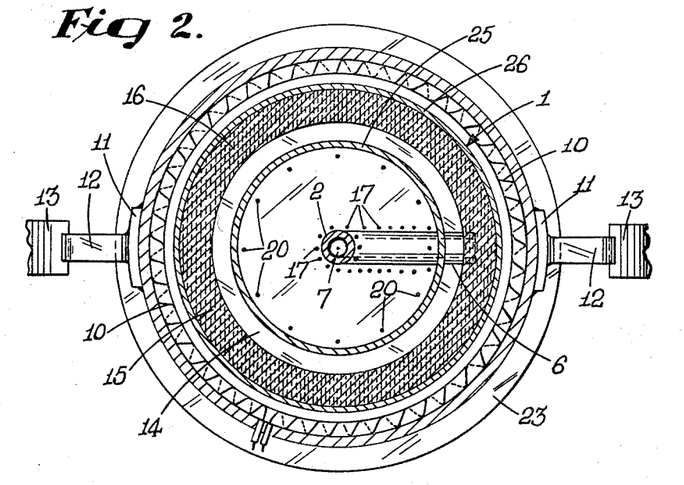
FIGURE 2 is a section on the line II—II in FIGURE 1.

Referring to FIGURES 1 and 2 of the drawings, the apparatus comprises annular container 1 having inner wall 25 and outer wall 26. Container 1 is mounted on shaft 2 which is carried in bearings 3 and is arranged to be rotatably driven at relatively high speed about vertical axis X—X from drive shaft 4 through gears 5. Container 1 is rotatable with shaft 2 about axis X—X.

Intermediate its ends, container 1 has inlet 6 communicating with bore 7 in shaft 2. At its upper and lower ends, container 1 has outlets 8, 9. Outlet 8 is arranged to discharge into stationary trough 22 and outlet 9 is arranged to discharge into stationary trough 23.

A plurality of regularly spaced annular radiant heater elements 10 surround container 1 and are connected together by links 11. Each link 11 presents a cam follower 12 engageable by a rotary cam 13. Cams 13 are so shaped and are arranged to rotate at such a speed that each heater element 10 is lifted vertically from a lower extreme position to an upper extreme position at a relatively slow speed and is then allowed to drop back rapidly under the action of gravity to the lower position. Lifting of the heater elements 10 can then be repeated. The stroke $x$ of vertical movement of heater elements 10 equals the spacing between adjacent heater elements 10. The action of the cams and the movement of the heater elements will be clear to a man skilled in the art of zone refining.

In use, material to be refined is introduced into container 1 through bore 7 in shaft 2 and inlet 6. The material may be introduced into container 1 in any suitable form, such as in powdered or molten form. When the material is introduced in molten form, it should be allowed to solidify before actual zone refining commences. In order to prevent molten input material from solidifying before entry into container 1, heater 17 is provided around shaft 2 and inlet tube 6.

Due to the rotation of container 1 about vertical axis X—X, the material is subjected to centrifugal force acting radially outward relative to container 1. The material is therefore urged against outer wall 26 of container 1. Outer wall 26 constitutes a retaining wall for the material. The quantity of material introduced into container 1 is controlled so that the material only partially fills container 1 in the direction of the centrifugal force so as to leave space 14 between material layer 15 and inner wall 25.

Each heater element 10 produces along its circumference a heating zone which is movable linearly relative to container 1 and longitudinally with respect to axis of rotation X—X, thereby to produce a plurality of spaced molten zones 16 in otherwise solid material. Molten zones 16 communicate with space 14 and move successively through the material to subject the material to a plurality of melting-freezing cycles as will be clear to a man skilled in the art. Heater elements 10 may execute one or more strokes of movement to obtain the required degree of purification.

The direction of zone movement is longitudinal relative to the axis of rotation and transversely to the direction of the centrifugal force.

The moving molten zones 16 cause purified material to be concentrated either at the top or the bottom of container 1 and impurities are concentrated at the opposite end of the container. Purified material and impurities are discharged from container 1 through outlets 8, 9 into troughs 22, 23, when molten zones in the material reach the upper and lower ends of the container. Heaters 18 and 24 are provided around outlets 8 and 9 respectively to prevent purified material and impurities from solidifying in the outlets. Heaters (not shown) may also be provided for troughs 22, 23. By facing intake mouths 19 of outlets 8, 9 radially, only excess purified material and impurities at the upper and lower ends of material layer 15 is withdrawn and a free flow of material through outlets 8, 9 is minimized.

It will be noticed that inlet 6 extends into material layer 15. Material will only flow into container 1 when the mouth of inlet 6 is in a molten zone. Pure material and impurities may be withdrawn continuously from outlets 8, 9.

When treating material, such as naphthalene, which tends to sublime easily, the inner wall 25 of container 1 is kept above the melting point of the material by means of anti-solidification heater 20. This ensures that any material condensing on inner wall 1a will do so as a liquid which will be centrifuged back to material layer 15. This serves to keep space 14 clear.

Heaters 17, 18, 24 and 20 are electrical heaters connected in series to slip rings 21 to which electrical current is supplied through brushes (not shown). If required, each of the heaters may be connected independently to its own pair or slip rings to permit individual external control of the various heaters.

Preferably, the centrifugal force exerted on the material in container 1 at least equals the force of gravity to ensure that the material is urged firmly against outer wall 26 of the container.

In one particular example of the apparatus illustrated in FIGURES 1 and 2, the inside diameter of outer container wall 26 is 1.5 inches and the container is rotatable at a speed of 600 revolutions per minute to create a centrifugal force of eight times the force of gravity at the inner surface of outer wall 26. Heater elements 10 are movable upwardly at a speed of 10 inches per hour to give the same speed of zone movement.

Figure 3:
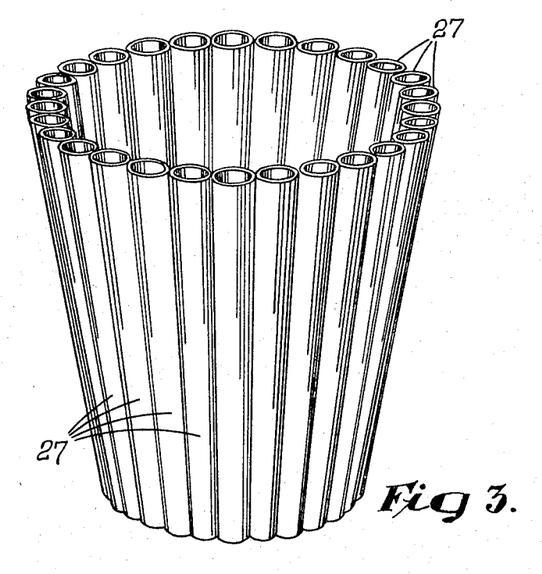
FIGURE 3 is a diagrammatical perspective view of an alternative form of container for use with the arrangement of FIGURES 1 and 2.

Instead of an annular container such as 1 in FIGURE 1 and FIGURE 2 which extends continuously in a circumferential direction, a plurality of tubular containers 27 may be arranged in circular formation with their axes converging as shown in FIGURE 3. Suitable material inlet and outlet means (not shown) are provided for each of the tubular containers 27. The angle of inclination of tubes 27 relative to the vertical preferably approximates the angle the free surfaces of liquid in the containers would assume at the speed of rotation of the containers. This is useful when using tubes of relatively large bore, since it minimizes any tendency of the material to gravitate to the bottom of the containers.

Heater elements similar to those used with the apparatus of FIGURES 1 and 2 may be used with containers 27.

Instead of containers 27 being inclined to the vertical in converging relationship as shown in FIGURE 3, containers 27 may be arranged with their axes parallel. Instead of a plurality of containers 27, a single tubular container may be provided.

Figure 4:
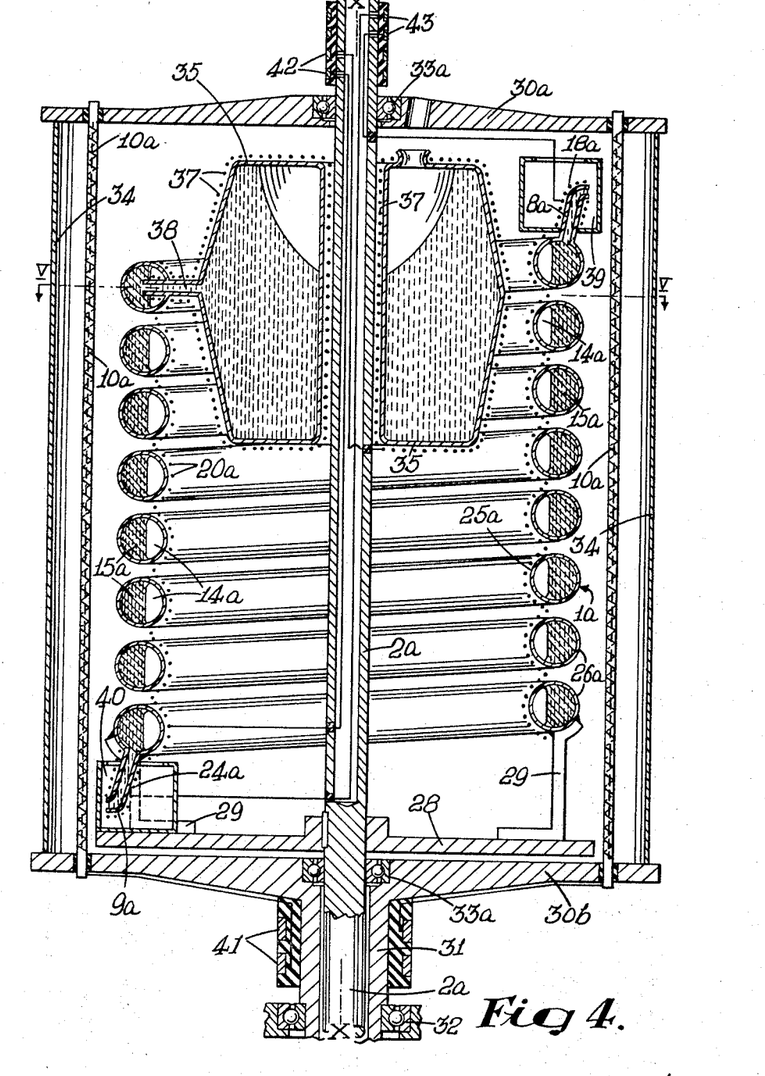
FIGURE 4 is a sectional elevational view of an embodiment of apparatus according to the invention, in which heating means is rotatable relative to a rotary container, and molten zone movement is in a direction transversely to the direction of centrifugal force.
Figure 5:
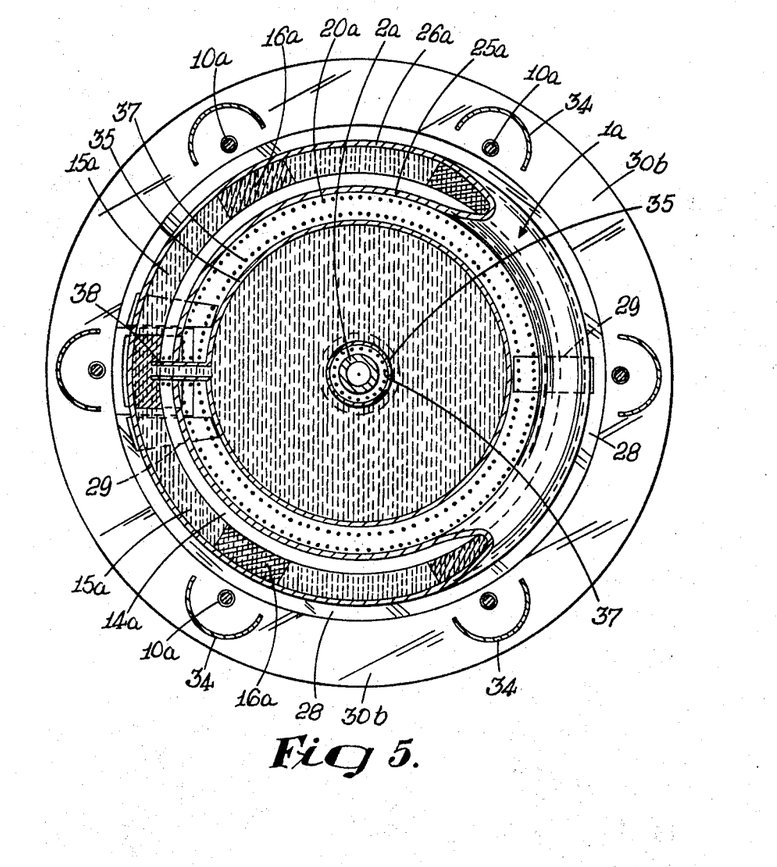
FIGURE 5 is a section on line V—V in FIGURE 4.

Referring now to FIGURES 4 and 5, container 1a is in the nature of a tube wound in cylindrical spiral formation and mounted on platform 28 by means of mountings 29. Platform 28 is fast with shaft 2a for rotation therewith about vertical axis X—X. Spiral container 1a is rotatable with shaft 2a at relatively high speed to subject material in the container to centrifugal force, thereby to urge the material into contact with outer wall portions 26a of the container, and leaving space 14a between inner wall portion 25a and material layer 15a. Outer wall portion 26a constitutes a retaining wall for material.

A plurality of linear, axially extending and circumferentially spaced radiant heater elements 10a are mounted on platforms 30a and 30b. Platform 30b is fast with sleeve 31 surrounding shaft 2a. Heater elements 10a are rotatable at relatively high speed about axis X—X with sleeve 31 which is carried in bearings 32. Platforms 30a, 30b are mounted on shaft 2a for rotation relative thereto, by means of bearings 33a. Shaft 2a and sleeve 31 are driven at slightly different speeds through suitable differential gearing (not shown) so that heater elements 10a rotate relative to container 1a.

Each heater element 10a is provided with its own reflector 34 which is also mounted on platforms 30a, 30b for rotation therewith. Each heater element produces along its length a heating zone which is rotatable relative to container 1a, thereby to produce opposite each heater element in each coil of the container a molten zone 16a in otherwise solid material. As a result, a plurality of spaced molten zones move at a relatively slow speed along the length of the spiral tube longitudinal with respect to the axis of rotation X—X and transversely to the direction of centrifugal force which acts radially with respect to the container. Molten zones 16a communicate with space 14a.

Container 1a may be filled with powdered material before commencement of refining. After the powdered material has been melted by the heaters, the cross-section of the spiral tube will only be partially filled since powdered material contains voids. However, it has been found more convenient to introduce the material into container 1a in molten form during rotation of the container. For this purpose, a supply reservoir 35 is mounted on shaft 2a for rotation therewith and with container 1a. Material is introduced into reservoir 35 whilst the apparatus is at rest and is melted by means of heater 37 during rotation of the apparatus. Molten material is centrifuged through capillary tube 38 into container 1a. The material may be introduced into container 1a at any point along its length.

Sampling from the ends of container 1a may be achieved through outlet tubes 8a, 9a, solid material in the outlet tubes being melted out by means of heaters 18a, 24a. The samples are collected in cups 39, 40 which rotate with container 1a. The samples collected in the cups are removed after the apparatus has been brought to rest. By keeping outlet tubes 8a, 9a heated by heaters 18a, 24a purified material and impurities may be collected continuously in cups 39 and 40 during rotation of the apparatus.

Radiant heater elements 10a are supplied with electrical current through slip rings 41 on sleeve 31. Anti-solidification heater 20a and heater 37 of reservoir 35 are connected in series and are supplied with electrical current through slip rings 42 on shaft 2a. Heaters 18a, 24a of outlets 8a, 9a, are connected in series and supplied with electrical current through slip rings 43 on shaft 2a. Each of the heaters may be supplied independently with current through its own pair of slip rings.

In a particular example of the apparatus of FIGURES 4 and 5, the outside diameter of spiral tube 1a is 8 inches and the container is rotatable at a speed of 275 revolutions per minute to create a centrifugal force of eight times the force of gravity at the inner surface of outer wall portion 26a. The heater elements 10a are rotatable at a speed to give a differential speed between the container and the heater elements of 1 revolution every three hours, thereby to move the molten zones 16a at a speed of 8½ inches per hour along the length of the container tube.

It will be appreciated that instead of linear heater elements and a spiral container one or more spiral shaped heater elements and a linear container may be relatively rotatable.

Figure 6:
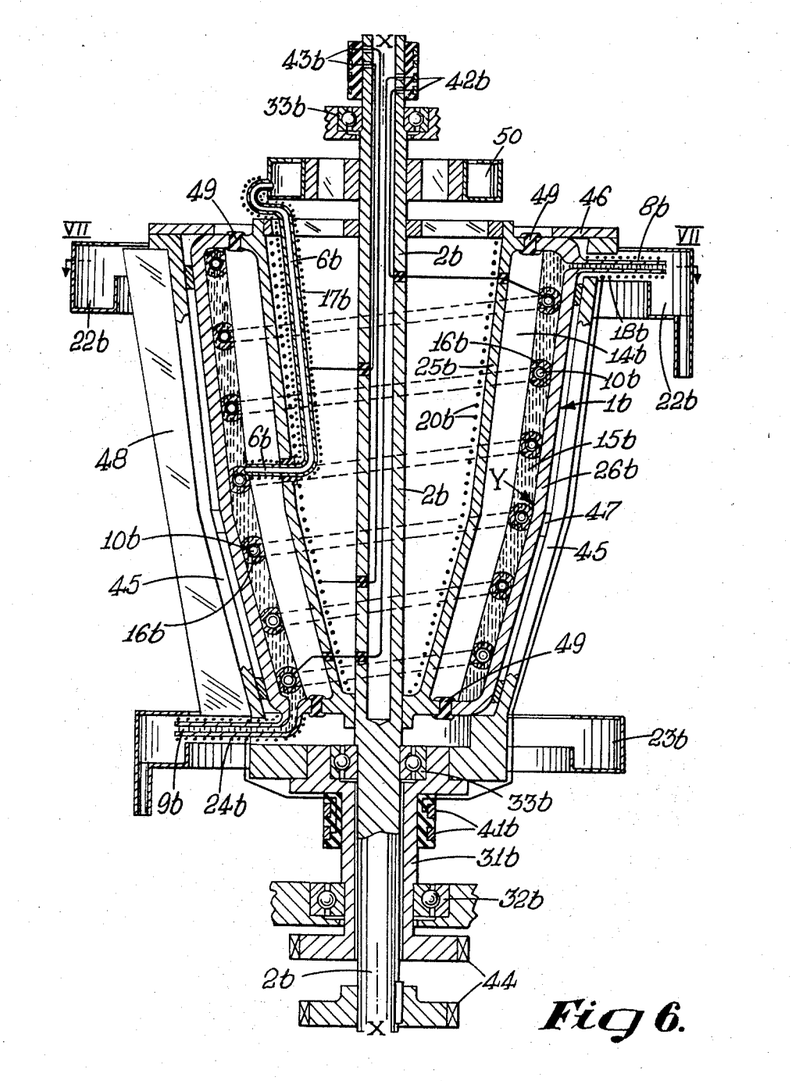
FIGURE 6 is a sectional elevational view of another embodiment of apparatus according to the invention, in which heating means is rotatable relative to a retaining wall of a rotary container and molten zone movement is in a direction transversely to the direction of centrifugal force.
Figure 7:
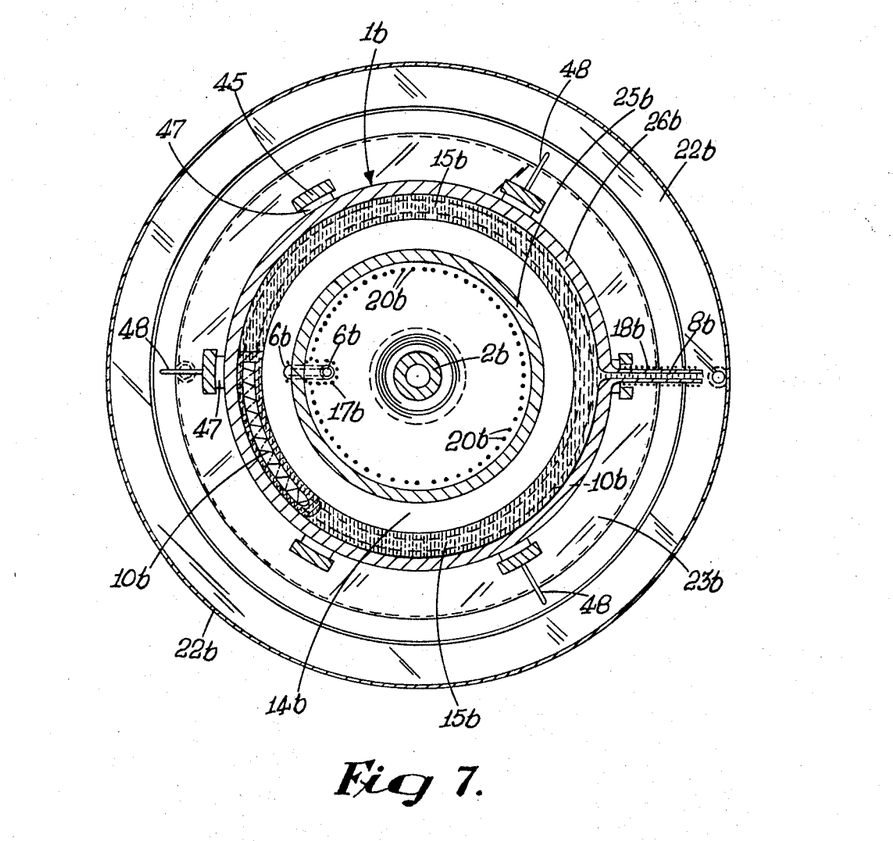
FIGURE 7 is a section on the line VII—VII in FIGURE 6.

Referring to FIGURES 6 and 7, annular container 1b of conical shape is defined by inner wall 25b mounted on shaft 2b for rotation therewith at relatively high speed, and outer wall 26b mounted on sleeve 31b surrounding shaft 2b. Shaft 2b and sleeve 31b are driven at slightly different speeds through differential gears 44 so that inner wall 25b rotates relative to outer wall 26b. Sleeve 31b is carried in bearings 32b and shaft 2b is rotatably mounted on sleeve 31b by means of bearings 33b.

Outer container wall 26b is held by support arms 45 and retaining ring 46 which are fast with and driven by sleeve 31b. To permit air movement around container 1b for cooling purposes, support arms 45 are spaced from outer container wall 26b by means of distance pieces 47. Cooling is enhanced by vanes 48.

Outer container wall 26b is sealed from inner container wall 25b by means of gaskets 49 which permit relative rotation between the inner and the outer walls.

The inclination to the vertical of the inner surface of outer wall 26b approximates the angle the free surface of liquid in the container would assume at the speed of rotation of the container.

Outer wall 26b acts as a retaining wall for material.

Spiral shaped immersion heater 10b is located within container 1b and is fast with inner wall 25b for rotation therewith relative to outer wall 26b. Material introduced into container 1b is urged into layer 15b against outer wall 26b under the influence of centrifugal force which acts radially outwards relative to container 1b. A space 14b is left between inner wall 25b and material layer 15b. Heater element 10b is located within material layer 15b. A spiral shaped molten zone surrounding heater element 10b extends circumferentially around container 1b from the top to the bottom of the container along the length of heater element 10b.

In operation, spiral heater element 10b moves slowly through material layer 15b and in each vertical section of the apparatus there is produced a plurality of molten zones spaced along the axis of rotation X—X and movable longitudinally with respect to that axis transversely to the centrifugal force acting radially outwardly with respect to the container. Material in the container is thus subjected to a plurality of melting-freezing cycles.

Solidification of material onto inner wall 25b is prevented by heaters 20b.

Material is fed to container 1b from a stationary reservoir (not shown) into annular trough 50 fast with shaft 2b and communicating with container 1b through inlet tube 6b heated by heater 17b. Purified material and impurities may be removed through outlet tubes 8b, 9b discharging into stationary troughs 22b, 23b.

The introduction of material into container 1b and the withdrawal of purified material and impurities from the container may be continuous or intermittent. If the withdrawal is continuous, it should be sufficiently slow, so that there is not simply a free flow of molten material from inlet 6b to outlets 8b, 9b along the continuous molten zone, but so that substantially all the material is subjected to a sufficient number of melting-freezing cycles.

Spiral immersion heater element 10b is supplied with electrical current through slip rings 42b on shaft 2b. Anti-solidification heater 20b and heater 17b of feed tube 6b are connected in series and supplied with current through slip rings 43b on shaft 2b. Heaters 18b and 24b of outlet tubes 8b, 9b are connected in series and supplied with current through slip rings 41b on sleeve 31b.

In a particular example of the apparatus of FIGURES 6 and 7, the inside diameter of outer container wall 26b is 190 millimeters at the top of the container, 144 millimeters at the change in slope at point Y, and 103 millimeters at the bottom of the container. The total height of the container from top to bottom is 250 millimeters and the change of slope at point Y is located 150 millimeters from the top. The outer wall 26b is rotatable at a speed of 275 revolutions per minute to create at the inner surface thereof a centrifugal force of eight times the force of gravity at the top of the container, 6.1 times the force of gravity at point Y and 4.35 times the force of gravity at the bottom of the container. Heater element 10b has 4.75 turns from top to bottom and a pitch of 2 inches. Heater element 10b is rotatable at a speed to give a differential speed between outer wall 26b and the heater element of 5 revolutions per hour, thereby to move the molten zone at a speed of 10 inches per hour through the material.

Figure 8:
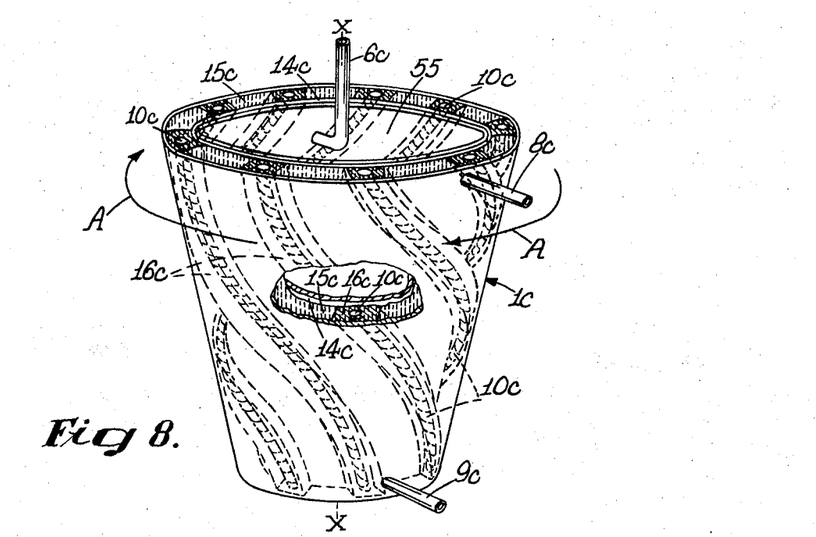
FIGURE 8 is a diagrammatical perspective view of a container and heater elements of a variation of the arrangement of FIGURES 6 and 7.

Referring to FIGURE 8, container 1c is of annular, frusto-conical formation and substantially similar in arrangement to container 1b of FIGURES 6 and 7. However, instead of a single spiral immersion heater element 10b extending around the circumference of the container from the top to the bottom thereof, container 1c is provided with a plurality of heater elements 10c producing molten zones 16c moving through material in the container in a direction transversely to the axis of rotation and the direction of centrifugal force.

With the direction of zone movement indicated by arrows A, the zone movement has a horizontal as well as downward component. When material containing impurities which are carried along the molten zones, is introduced into container 1c through inlet 6c, the impurities will tend to move downwardly to the outlet 9c at the lower end of the container. Purified material could then be withdrawn through upper outlet 8c and impurities could be withdrawn through lower outlet 9c.

Heater elements 10c may be immersion heaters located within material in container 1c as shown in FIGURE 8, or may be radiant heaters located outside the annular container or in the inner space 55 defined by the container.

Figure 9:
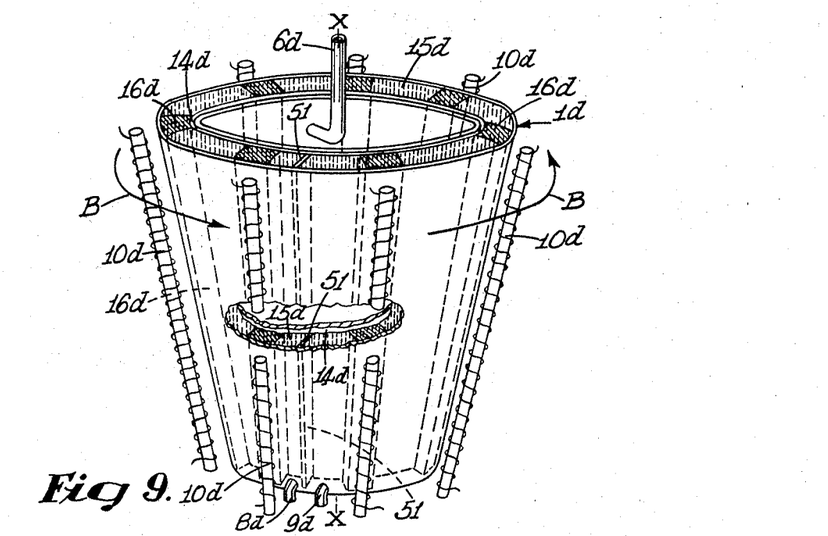
FIGURE 9 is a diagrammatical perspective view of a container and heater elements of another variation of the arrangement of FIGURES 6 and 7.

The arrangement of FIGURE 9 is similar to that of FIGURE 8 with the exception that linear heater elements 10d are disposed longitudinally with respect to the axis of rotation X—X of container 1d to produce axially disposed linear molten zones 16d moving transversely to the axis of rotation and the direction of centrifugal force around the circumference of the container. Material is introduced through inlet 6d and the treated material is removed through outlets 8d and 9d. Between outlets 8d and 9d a separating wall 51 is provided. With zone movement in the direction indicated by arrows B, the beginning of the charge of material is to the right of separating wall 51, and the end of the charge of material is to the left of separating wall 51.

The angle of inclination of the outer walls of the containers of FIGURES 8 and 9 should, as in the case of the container of FIGURE 6, approximate the angle that would be assumed by the free surface of liquid in the container at the speed of rotation of the container.

Figure 10:
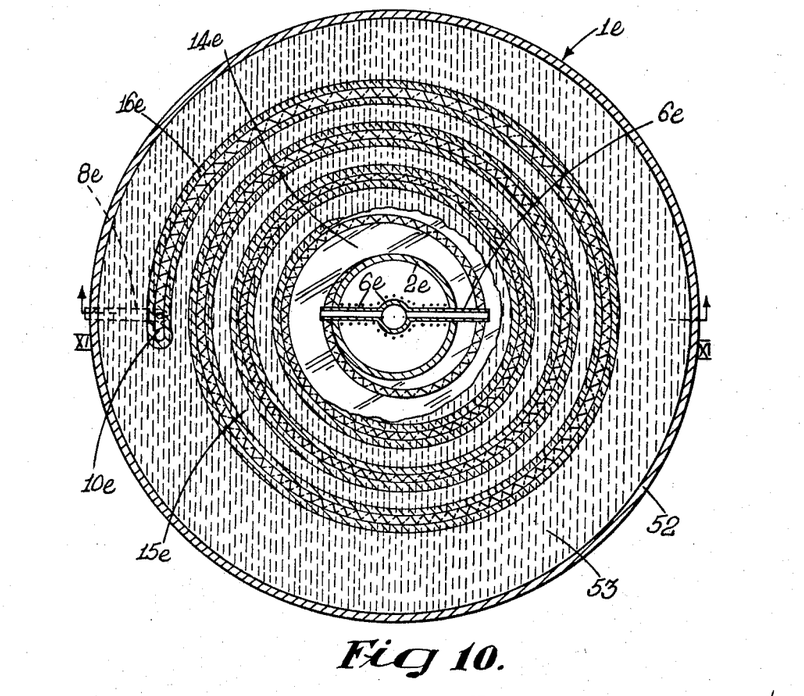
FIGURE 10 is a horizontal section taken on line X—X in FIGURE 11, of an embodiment of apparatus according to the invention in which heating means is rotatable relative to a rotary container and molten zone movement is longitudinally with respect to the direction of centrifugal force.
Figure 11:
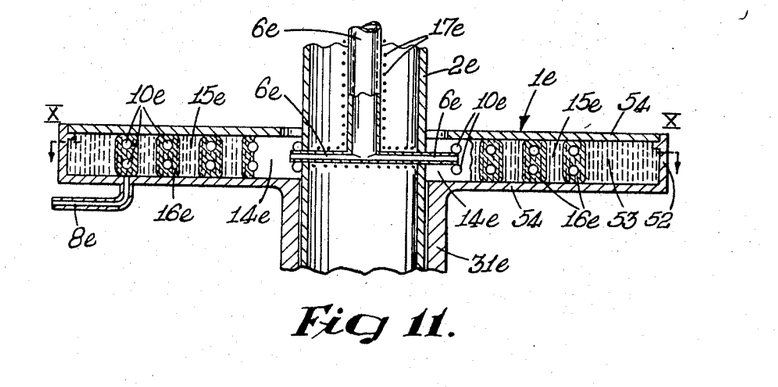
FIGURE 11 is a vertical section on line XI—XI in FIGURE 10.

In the arrangement of FIGURES 10 and 11, container 1e comprises spaced discs 54 and end wall 52, and is mounted on sleeve 31e for rotation therewith. Immersion heater 10e of flat spiral formation is fast with shaft 2e for rotation therewith and is located within container 1e. Shaft 2e and sleeve 31e are arranged to be driven at relatively high speed by means of suitable differential gearing (not shown) so that they are relatively rotatable at a small differential speed.

Heater 10e is immersed in material 15e in container 1e. A spiral shaped molten zone 16e is formed around heater 10e along its entire length and permits heater 10e to rotate slowly through otherwise solid material. It will be seen from FIGURE 10 that along each radius of the container, a set of radially spaced molten zones are produced. During rotation of spiral heater 10e relative to each radius of the container, each set of spaced molten zones move in succession radially with respect to the container and longitudinally with respect to the centrifugal force. Depending on the relative differential movement between heater 10e and material layer 15e, zone movement may be radially inwards or outwards so as to be in the same or opposite direction to that in which the centrifugal force acts.

Upon starting up of the apparatus, heater 10e will be encased in solid material before a surrounding molten zone is established to permit movement of the heater through the material. Heater 10e should therefore be switched on to permit the formation of a molten zone, before relative rotation of the relatively movable parts is commenced. Similarly, at the end of an operation, relative rotation of the relatively movable parts should be terminated before the heater is switched off. This is a precaution that should be observed with all types of apparatus according to the invention incorporating immersion heaters.

Material may be introduced continuously through inlet tubes 6e, but withdrawal through outlet 8e should be very slow or intermittent so that material does not simply flow from inlet tubes 6e along molten zone 16e to outlet 8e without undergoing one or more melting-freezing cycles.

It is not essential to provide end wall 52 to retain the material against the action of centrifugal force, if the outer end of heater 10e is spaced a sufficient distance from the outer peripheries of discs 54 so as to provide a rigid wall 53 of permanently solid material which rotates with container 1e. A retaining wall may therefore be provided by the material itself.

It will be noticed that container 1e is only partially filled in the direction of the centrifugal force, inner space 14e being left. Since molten zone 16e is continuous and communicates with space 14e, there is no danger of pressure build-up due to expansion during melting or freezing since expansion and contraction can take place along molten zone 16e into space 14e.

Where a layer of material under treatment according to the invention is relatively thin, cooling of the material behind each moving zone does not normally create serious problems. However, where thick layers of material are treated, removal of heat may become a problem.

Figure 12:
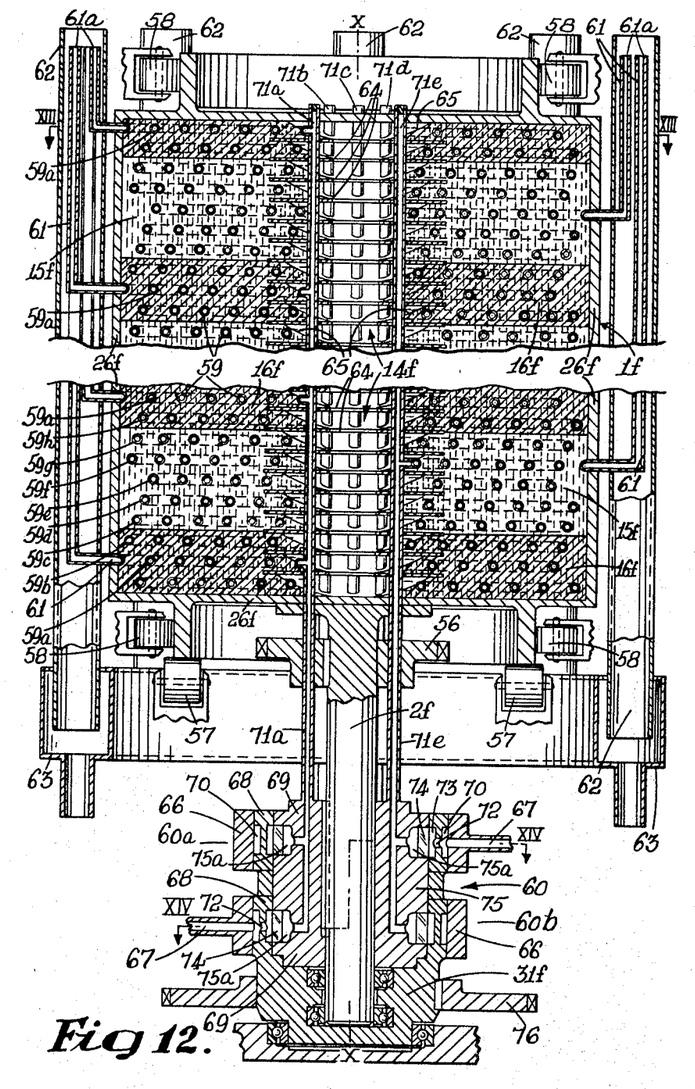
FIGURE 12 is a sectional elevational view of an embodiment of apparatus according to the invention in which heating means is fast with a rotary container and the direction of zone movement is transversely to centrifugal force.
Figure 13:
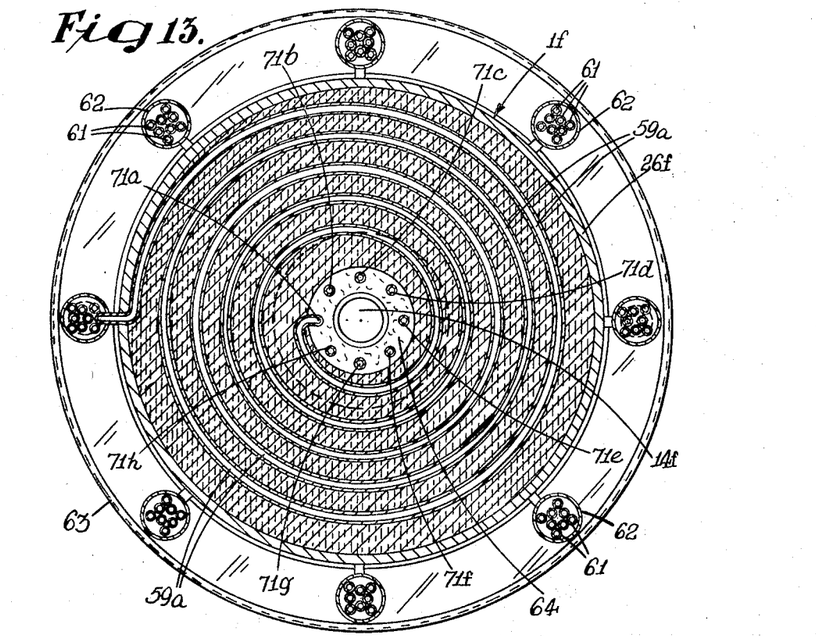
FIGURE 13 is a section on line XIII—XIII in FIGURE 12.
Figure 14:
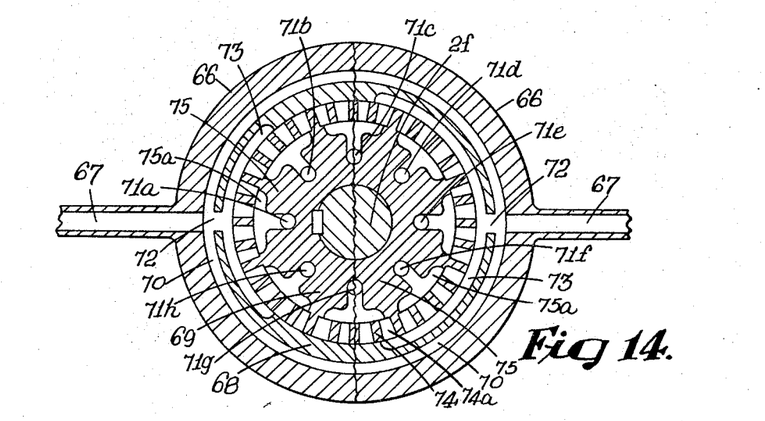
FIGURE 14 is a section on line XIV—XIV in FIGURE 12.

The arrangement of FIGURES 12 to 14 provides for the melting of material in a plurality of movable zones and also for the cooling of material between adjacent molten zones.

Container 1f is in the form of a drum with a peripheral retaining wall 26f and mounted on shaft 2f for rotation therewith at relatively high speed. Shaft 2f is adapted to be rotatably driven through gear 56. Container 1f is rotatably carried by rollers 57 and is rotatably supported in vertical position by rollers 58.

Tubes 59 for conveying heat transfer fluid are of flat spiral formation and are located within container 1f in axial spaced relationship. Tubes 59 are fast with container 1f for rotation with retaining wall 26f.

Different sets of tubes 59a, 59b . . . 59h are supplied successively with heating fluid from distributor 60 through distributing conduits 71 to produce a plurality of spaced molten zones 16f movable through material 15f longitudinally with respect to the axis of rotation X—X and transversely to centrifugal force acting radially with respect to the container. Cooling fluid is supplied from distributor 60 to cool material 15f between molten zones 16f.

Heat transfer fluid is discharged from spiral tubes 59 through outlets 61 into vertical conduits 62 which are rotatable with container 1f. Vertical conduits 62 discharge into stationary trough 63. The mouths 61a of outlets 61 are all at the same level to ensure that the same head is applied to fluid flowing through the various tubes 59.

Material 15f only partially fills container 1f in the direction of centrifugal force to leave central space 14f. Molten zones 16f communicate with space 14f.

Barriers 64 shown in FIGURES 12 and 13 serve two purposes. Firstly, they prevent molten material from running down in central space 14f where the centrifugal force is relatively small. For instance, even if the free surface 65 of the molten material assumes a relatively small angle relative to the horizontal, molten material will still be retained between barriers 64.

Secondly, since certain materials, particularly organic compounds, expand on melting and such expansion is appreciable with thick layers of material, there is a danger of molten material overflowing into central space 14f.

Barriers 64 minimizes such overflowing of molten material due to expansion.

With materials that contract on melting, there is little danger of such overflowing since the solid zones between the molten zones serve to contain the molten material and barriers 64 can be dispensed with.

Considering the distribution of heat transfer fluid in greater detail, distributor 60 comprises upper section 60a for cooling fluid and lower section 60b for heating fluid.

Upper and lower distributor sections 60a and 60b are identical and each comprises a stationary sealing ring 66 with an inlet 67; an outer rotary ring 68 mounted on sleeve 31f for rotation therewith; and inner rotary ring 69 mounted on shaft 2f for rotation therewith relative to outer rotary ring 68. Outer rotary ring 68 presents an external peripheral groove 70 extending around the entire periphery of outer rotary ring 68 and communicating with feed passage 72 passing through the wall of outer rotary ring 68. Feed passage 72 communicates with internal peripheral groove 73 extending around part of the periphery of outer rotary ring 68.

Inner rotary ring 69 comprises perforated annulus 74 fast with hub 75 on shaft 2f. Hub 75 presents a series of peripheral grooves 75a each communicating externally with a plurality of perforations 74a through annulus 74 and internally with its own conduit 71 which in turn, communicates with its own set of spaced tubes 59 in container 1f.

Shaft 2f and sleeve 31f are arranged to be rotatably driven relative to one another at a small differential speed through differential gears 56 and 76.

During operation, the feed passage 72 through each outer rotary ring 68 is in communication with its stationary inlet 67 via external groove 70 irrespective of the circumferential disposition of the feed passage 72 relative to inlet 67. Heat transfer fluid can therefore pass from inlet 67 via external groove 70, feed passage 72 and internal groove 73 in outer rotary ring 68, through perforations 74a in annulus 74 into those grooves 75a in hub 75 which are in communication with internal groove 73 in outer rotary ring 68, and thus into the distributing conduits 71 in communication with the groove 75a in question.

It will be appreciated that with the distributor parts in the relative positions illustrated, distributing conduit 71a receives a maximum supply of heating fluid from inlet 67 in lower distributor section 60b for transfer to its set of container tubes 59a. Distributing conduits 71b and 71h immediately adjacent conduit 71a receive a smaller supply of heating fluid for transfer to their sets of container tubes 59b and 59h respectively. Molten zones 16f are therefore centered on the set of container tubes 59a. Distributing conduits 71a, 71b and 71h are shut off from cooling fluid entering upper distributor section 60a.

Similarly, distributor conduits 71d, 71e and 71f receive a maximum supply of cooling fluid from inlet 67 in upper distributor section 60a for transfer to their sets of container tubes 59d, 59e and 59f respectively. Distributor conduits 71c and 71g receive a smaller supply of cooling fluid for transfer to their sets of container tubes 59c and 59g respectively. Material 15f between molten zones 16f in container 1f is thus cooled. Distributing conduits 71c, 71d, 71e, 71f, 71g are shut off from the supply of heating fluid.

During relative rotation between outer rotary ring 68 and inner rotary ring 69, the distribution of heating fluid to container tubes 59 varies so that the molten zones 16f are centered on successive sets of tubes 59a, 59b, to 59h so that molten zones 16f move successively through material 15f in a direction longitudinally with respect to the axis of rotation X—X and transversely to the direction of centrifugal force. A cooling zone movable with the molten zones is produced between each pair of adjacent molten zones 16f.

In a particular example of the apparatus of FIGURES 12 to 14, retaining wall 26f of container 1f has an internal diameter of 36 inches. With the container rotating at a speed of 180 revolutions per minute and with the free surfaces 65 of material 15f lying at an average diameter of 12 inches, the material is subjected to a centrifugal force of 5.5 times the force of gravity at the free surfaces 65 and to a centrifugal force of 16.56 times the force of gravity at retaining wall 26f. Spiral tubes 59 have an outside diameter of ⅜ inch, are axially spaced a distance of $11/16$ inch between centers and are supplied by 8 distributing conduits 71. With a differential rotation of 2 revolutions per hour between outer rotary ring 68 and inner rotary ring 69, a zone movement of 11 inches per hour is obtained.

It will be appreciated that with the apparatus of FIGURES 12 to 14, tubes 59 in container 1f constitutes heating means rotatable with retaining wall 26f, different portions of the heating means being heatable successively to produce a plurality of heating zones movable relative to retaining wall 26f.

It will be observed that with all the particular embodiments described above and illustrated in the accompanying drawings, the molten zones communicate with free space in the containers. There is accordingly no danger of pressure build-up due to expansion during melting or freezing since expansion and contraction can take place into and out of the free space.

Also, in all these embodiments the containers are rotatable about their own axes. Where a container is of spiral formation, the spiral axis is also the container axis. Where rotary heating means is provided, the heating means also rotates about the container axis.

It will be appreciated that many variations in detail in container and heater arrangement are possible without departing from the scope of the appended claims. For example, instead of a container of cylindrical spiral formation and axially disposed linear heater elements, a container of flat spiral formation and radially disposed linear heater elements may be provided, both the container and the heater elements being rotatable about the axis of the container which is also the spiral axis.

Instead of producing a plurality of spaced molten zones simultaneously and moving them in succession through the material, the heating means may produce a single heating zone to produce a single molten zone at a time in the material. The single molten zone may be moved through the material one or more times as required to subject the material to one or more melting-freezing cycles.

Whereas conventional zone refining is normally limited to a starting material of relatively high purity, say 98% pure substance and 2% impurities, it has been found that refining according to the invention can be employed on starting material having a degree of purity substantially lower than has been possible hitherto.

Refining according to the invention may be improved by suitable elution of the material during zone-refining. Elution may be carried out with a trace amount or amounts of one or more easily removable, heat stable compounds which attract or absorb impurities in the material and which is/are added to the material before refining commences.

The efficacy of refining according to the invention is illustrated by the following example. A sample of crude coke oven naphthalene was treated in conventional manner in a commercially available straight tube apparatus in which a tube of 6 millimeter bore was disposed vertically and zone movement was downwardly at a speed of 1 inch per hour. After 5 melting-freezing cycles, the benzthiophene content at the head of the column of material in the tube from which zone movement commenced, was decreased to a value of 0.3% from an initial value of 1.0% in the starting material. Benzthiophene is the most difficult impurity to remove from naphthalene.

A sample of the same crude coke oven naphthalene was treated in accordance with the invention in apparatus similar to that illustrated in FIGURES 4 and 5 of the accompanying drawings. The spiral container had a bore of 10 millimeters and was rotated to produce a centrifugal force of 8 times the force of gravity. Zone movement had a speed of 8 inches per hour. After 5 melting-freezing cycles, the benzthiophene content at the head of the column of material under treatment was reduced to less than 0.1% from the initial value of 1.0% in the starting material.

Normally, for any given number of melting-freezing cycles, refining improves with decreasing speed of zone movement. In this regard, the treatment according to the invention was at a considerable disadvantage in relation to the conventional treatment, but still gave vastly superior results.

Although quantitative results are not available, it has been found that judged by a decrease in the brown colour of crude naphthalene subjected to centrifugal force of 8 times the force of gravity, treatment according to the invention achieves purification at a zone speed of as high as 24 inches per hour.

With zone-refining according to the invention containers, such as glass tubes, of long length can be used without technical difficulties. By the use of long containers, complex mixtures can be separated by zone-melting the mixture into a column of solvent.

Also, the long length of container which may be employed facilitates the continuous refining of material because it allows the material to undergo several zone-melting cycles between a point of introduction and a point of discharge at a "pure" end of the tube to one side of the point of introduction, while at the same time enabling the much slower process of concentration of impurities to take place on the opposite side of the point of introduction.

Cracking or shattering of the container is minimized or eliminated and seepage of molten material under recrystallised areas is minimized.

Zone-refining can be accelerated considerably.

What we claim is:

1. A method of zone refining crystalline material comprising the steps of introducing material to be refined into a container; heating the material to produce at least one finite molten zone in the material which is otherwise of solid form, the finite molten zone extending part only of the distance between a first region in the material and a second region in the material spaced from the first; moving the finite molten zone through the material from the first to the second region to subject successive zones of the material to a melting-freezing cycle; rotating the container during movement of the molten zone about an axis spaced from the molten zone, thereby subjecting the material to centrifugal force urging the material against a wall of the container; and introducing the material into the container in a quantity to fill the container only partially in the direction of the centrifugal force.

2. A method as claimed in claim 1, and moving said molten zone longitudinally with respect to the direction of the centrifugal force.

3. A method as claimed in claim 1, wherein the molten zone communicates with free space in the partially filled container.

4. A method as claimed in claim 1, and rotating the container at a speed such that the resultant centrifugal force at least equals the force of gravity.

5. A method as claimed in claim 1, and eluding the material during the zone refining.

6. A method of zone refining crystalline material comprising the steps of introducing material to be defined into a container; heating the material to produce at least one finite molten zone in the material which is otherwise of solid form, the finite molten zone extending part only of the distance between a first region in the material and a second region in the material spaced from the first; moving the finite molten zone through the material from the first to the second region to subject successive zones of the material to a melting-freezing cycle; rotating the container during movement of the molten zone about an axis spaced from the molten zone and extending in the direction of zone movement, thereby subjecting the material to centrifugal force acting transversely to the direction of zone movement and urging the material against a wall of the container; and introducing the material into the container in a quantity to fill the container only partially in the direction of the centrifugal force.

7. A method of zone refining crystalline material comprising the steps of introducing material to be refined into a container; heating the material to produce a finite molten zone in the material which is otherwise of solid form, the finite molten zone extending part only of the distance between a first region in the material and a second region in the material spaced from the first; moving the finite molten zone through the material from the first to the second region to subject successive zones of the material to a melting-freezing cycle; repeating the step of moving a finite molten zone through the material to subject successive zones of the material to a plurality of melting-freezing cycles; rotating the container during the melting-freezing cycles about an axis spaced from the molten zone, thereby subjecting the material to centrifugal force urging the material against a wall of the container; and introducing the material into the container in a quantity to fill the container only partially in the direction of the centrifugal force.

8. A method of zone refining crystalline material comprising the steps of introducing material to be refined into a container; heating the material to produce simultaneously a plurality of finite molten zones spaced apart between two spaced regions in the material, each finite molten zone extending part only of the distance between the two spaced regions; moving the finite molten zones in succession through the material between the two spaced regions to subject successive zones of the material to a plurality of melting-freezing cycles; rotating the container during the melting-freezing sequence about an axis spaced from the molten zones, thereby subjecting the material to centrifugal force urging the material against a wall of the container; and introducing the material into the container in a quantity to fill the container only partially in the direction of the centrifugal force.

9. A method of zone refining crystalline material comprising the steps of introducing material to be refined into a container; heating the material to produce a plurality of spaced molten zones in the material which is otherwise of solid form; moving the molten zones in succession through the material to subject the material to a plurality of melting-freezing cycles; rotating the container during movement of the molten zones about an axis spaced from the molten zones and extending in the direction of zone movement, thereby subjecting the material to centrifugal force at least equal to the force of gravity and acting transversely to the direction of zone movement; and introducing the material into the container in a quantity to fill the container only partially in the direction of the centrifugal force, the molten zones communicating with free space in the partially filled container.

10. An improved method of zone refining crystalline material including the steps of introducing the material to be refined into a container, heating the material to produce therein at least one molten zone of substantially constant width and bounded on two opposite sides by material which is in the solid state, and moving the molten zone through the material to subject the latter to a melting-freezing cycle, wherein the improvement comprises rotating the material, during the zone refining thereof, about an axis which does not run through the molten zone, thereby urging the material against a wall of the container, the quantity of material being such that the material only partially fills the container in the direction of the centrifugal force resulting from the rotation.

11. A method as claimed in claim 10, wherein the molten zone is moved transversely to the direction of the centrifugal force.

12. A method as claimed in claim 10, wherein the molten zone is moved longitudinally with respect to the direction of the centrifugal force.

13. A method as claimed in claim 10, wherein the molten zone communicates with free space in the partially filled container.

14. A method as claimed in claim 10, wherein the material is subjected to a plurality of melting-freezing cycles.

15. A method as claimed in claim 14, wherein a plurality of spaced molten zones are produced simultaneously in the material and are moved in succession through the material.

16. A method as claimed in claim 10, wherein the centrifugal force at least equals the force of gravity.

17. A method as claimed in claim 10, wherein the material is eluted during zone refining.

18. An improved method of zone refining crystalline material including the steps of introducing material to be refined into a container, heating the material to produce therein a plurality of spaced molten zones of substantially constant width, each molten zone being bounded on two opposite sides by solid material, and moving the molten zones in succession through the material to subject the latter to a plurality of melting-freezing cycles; the improvement comprising rotating the material, during the zone refining thereof, about an axis which does not run through any of the molten zones, at a speed at which the material is subjected to a centrifugal force at least equal to the force of gravity, the quantity of the material being such that the material only partially fills the container in the direction of centrifugal force, the molten zones communicating with free space in the partially filled container.

19. An improved zone refining apparatus including a container which is of spiral formation and heating means for producing at least one heating zone in the container, the heating zone producing in material in the container a molten zone of substantially constant width and bounded on two opposite sides by solid material; wherein the improvement comprises means for rotating the container, during zone refining of the material, about the axis of the spiral which does not run through the molten zone, thereby urging the material which partially fills the container against a wall of the container, and actuating means for moving the molten zone through the material by rotating the heating means relative to the container about the axis of the spiral, the heating means comprising at least one linear element.

20. Zone refining apparatus comprising a container of spiral formation rotatable about the axis of the spiral; drive means for rotating the container at a speed producing centrifugal force urging material in the container against an outer wall of the container; heating means comprising at least one linear element rotatable relative to the container substantially about the axis of rotation of the spiral and operative to produce at least one finite molten zone in otherwise solid material in the container; and drive means for rotating the heating means, thereby to move the molten zone through the material.

21. Zone refining apparatus comprising a material container rotatable about an axis and having a retaining wall spaced from the axis and rotatable with the container about the axis; drive means operative to rotate the container at a speed producing centrifugal force in excess of the force of gravity to urge material in the container against the retaining wall; heating means operatively related to the container to create at least one heating zone producing a finite molten zone spaced from the axis of rotation in otherwise solid material located against the retaining wall; and actuating means operative to move the heating zone relative to the rotating retaining wall, thereby to move the molten zone through the material in spaced relationship to the axis of rotation.

22. Zone refining apparatus comprising a material container rotatable about its axis and having a material retaining wall spaced from the axis and rotatable with the container about its axis; drive means operative to rotate the container at a speed producing centrifugal force in excess of the force of gravity to urge material in the container against the retaining wall; heating means fast with the container and rotatable therewith, the heating means comprising a plurality of portions which are spaced apart in a longitudinal direction with respect to the axis of rotation and which are operatively related to the container to produce a plurality of spaced-apart, finite molten zones spaced from the axis of rotation in otherwise solid material located against the retaining wall; control means for the heating means; and a plurality of connections between the control means and different portions of the heating means, the control means being operative to direct heating medium successively along different connections to different portions of the heating means, thereby successively to heat different portions of the heating means to move the molten zones axially through the material transversely to the direction of the centrifugal force and in spaced relationship to the axis of rotation.

References Cited

UNITED STATES PATENTS

| | | | |
|---|---|---|---|
| 2,696,307 | 12/1954 | Rush | 210—179 |
| 2,952,722 | 9/1960 | Jackson | 23—213 |
| 3,258,314 | 6/1966 | Redmond | 23—213 |
| 3,293,266 | 3/1966 | Moates | 23—213 |
| 3,337,303 | 8/1967 | Lorenzini | 23—301 |

NORMAN YUDKOFF, *Primary Examiner.*

E. P. HINES, *Assistant Examiner.*

U.S. Cl. X.R.

23—273; 148—1.5; 219—10.73